(12) United States Patent
Nakata et al.

(10) Patent No.: US 12,273,764 B2
(45) Date of Patent: Apr. 8, 2025

(54) COMMUNICATION DEVICE AND COMMUNICATION METHOD

(71) Applicant: DENSO CORPORATION, Kariya (JP)

(72) Inventors: Tsuneo Nakata, Kariya (JP); Kousuke Yamaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 338 days.

(21) Appl. No.: 17/867,721

(22) Filed: Jul. 19, 2022

(65) Prior Publication Data

US 2023/0026835 A1 Jan. 26, 2023

(30) Foreign Application Priority Data

Jul. 21, 2021 (JP) ................. 2021-120649

(51) Int. Cl.
*H04W 28/02* (2009.01)
*H04W 4/48* (2018.01)
*H04W 28/10* (2009.01)

(52) U.S. Cl.
CPC ......... *H04W 28/0236* (2013.01); *H04W 4/48* (2018.02); *H04W 28/10* (2013.01)

(58) Field of Classification Search
CPC .... H04W 28/0236; H04W 4/48; H04W 28/10
See application file for complete search history.

(56) References Cited

U.S. PATENT DOCUMENTS

2008/0159135 A1* 7/2008 Caram .................. H04L 47/525
370/468
2010/0172243 A1 7/2010 Nakata
2014/0016474 A1 1/2014 Beheshti-Zavareh et al.
2015/0163155 A1 6/2015 Beheshti-Zavareh et al.
(Continued)

FOREIGN PATENT DOCUMENTS

| JP | 2004282705 A | 10/2004 |
|---|---|---|
| JP | 2009-111945 A | 5/2009 |
| JP | 4488256 B2 | 6/2010 |

(Continued)

OTHER PUBLICATIONS

3GPP TS 38.300 V16.6.0 (Jun. 2021), 3rd Generation Partnership Project; Technical Specification Group Radio Access Network; NR; NR and NG-RAN Overall Description; Stage 2 (Release 16).

(Continued)

*Primary Examiner* — Sharad Rampuria
(74) *Attorney, Agent, or Firm* — Harness, Dickey & Pierce, P.L.C.

(57) ABSTRACT

A communication device controls a first communication flow performed by a first terminal and a second communication flow performed by a second terminal. Both of the first communication flow and the second communication flow pass through a sharing section, and the second communication flow has a higher priority than a priority of the first communication flow. The communication device acquires a communication delay in the sharing section; acquires a rated delay of the second communication flow, the rated delay is a communication delay allowed to the second communication flow; and limits input of data from the first communication flow and the second communication flow to the sharing section based on a comparison result between the communication delay of the sharing section and the rated delay.

18 Claims, 12 Drawing Sheets

(56) References Cited

U.S. PATENT DOCUMENTS

2015/0296404 A1* 10/2015 Sharma .................. H04W 4/70
                                                            370/230
2022/0014964 A1*  1/2022 Fang .................... H04L 43/062

FOREIGN PATENT DOCUMENTS

| JP | 2015-526036 A | 9/2015 |
| JP | 2019-118072 A | 7/2019 |

OTHER PUBLICATIONS

RFC 1633, "Integrated Services in the Internet Architecture: an Overview," R. Braden, D. Clark, S. Shenker, Jul. 1994.
Neal Cardwell et al., "BBR: Congestion-Based Congestion Control", acmqueue, 60(2), pp. 58-66, Feb. 2017 (Google).

* cited by examiner

MEASUREMENT VALUE OF COMMUNICATION DELAY > RATED DELAY

FIG. 10 COMPARATIVE EXAMPLE

COMMUNICATION DEVICE AND COMMUNICATION METHOD

CROSS REFERENCE TO RELATED APPLICATION

The present application claims the benefit of priority from Japanese Patent Application No. 2021-120649 filed on Jul. 21, 2021. The entire disclosure of the above application is incorporated herein by reference.

TECHNICAL FIELD

The present disclosure relates to a communication device and a communication method.

BACKGROUND

There has been known an information communication system in which a transmitting terminal transmits data to a receiving terminal in real time.

SUMMARY

A communication device includes one or more processors, which control a first communication flow performed by a first terminal and a second communication flow performed by a second terminal. Both of the first communication flow and the second communication flow pass through a sharing section, and the second communication flow has a higher priority than a priority of the first communication flow. The one or more processors are configured to: acquire a communication delay in the sharing section; acquire a rated delay of the second communication flow, the rated delay is a communication delay allowed to the second communication flow; and limit input of data from the first communication flow and the second communication flow to the sharing section based on a comparison result between the communication delay of the sharing section and the rated delay.

BRIEF DESCRIPTION OF DRAWINGS

Objects, features and advantages of the present disclosure will become apparent from the following detailed description made with reference to the accompanying drawings. In the drawings.

DETAILED DESCRIPTION

A communication system in which a transmitting terminal transmits data to a receiving terminal in real time is disclosed in JP 2009-111945 A. In such a system, multiple setting conditions each of which sets a transmission packet quantity per unit time and a bit rate of transmission data required to be output from the transmitting terminal are calculated corresponding to an index value indicating a data transfer state of network. For each of the calculated multiple setting conditions, an influence on a transmission data quality and delay amount of data transmission through the network are evaluated. Then, the transmission rate is controlled according to a proper setting condition selected among the multiple setting conditions.

In a system disclosed in Neal Cardwell et. al, "BBR: Congestion-Based Congestion Control", acmqueue, 60(2), pp 58-66, 2017 (Google), an increase in delay and saturation state of communication bandwidth are monitored, and an input flow rate per unit time is adjusted so that the system operates at an optimum operating point where the saturation of bandwidth starts. In this system, a load on the network is changed periodically to update a round trip time (RTT) and an estimated bandwidth. At this time, an upper limit of the load is set to gain, and a control aggressive level is adjusted by this gain.

In JP 2009-111945 A, the transmission rate is adjusted by the application executed by the transmitting terminal. Thus, when the network congestion is caused by an influence of bufferbloat of a communication load in another communication node, the communication delay cannot be suppressed.

The following will describe embodiments of the present disclosure with reference to the accompanying drawings. In the following embodiments, substantially same structural configurations are designated with the same reference symbols to simplify the description.

First Embodiment

Figure 1:
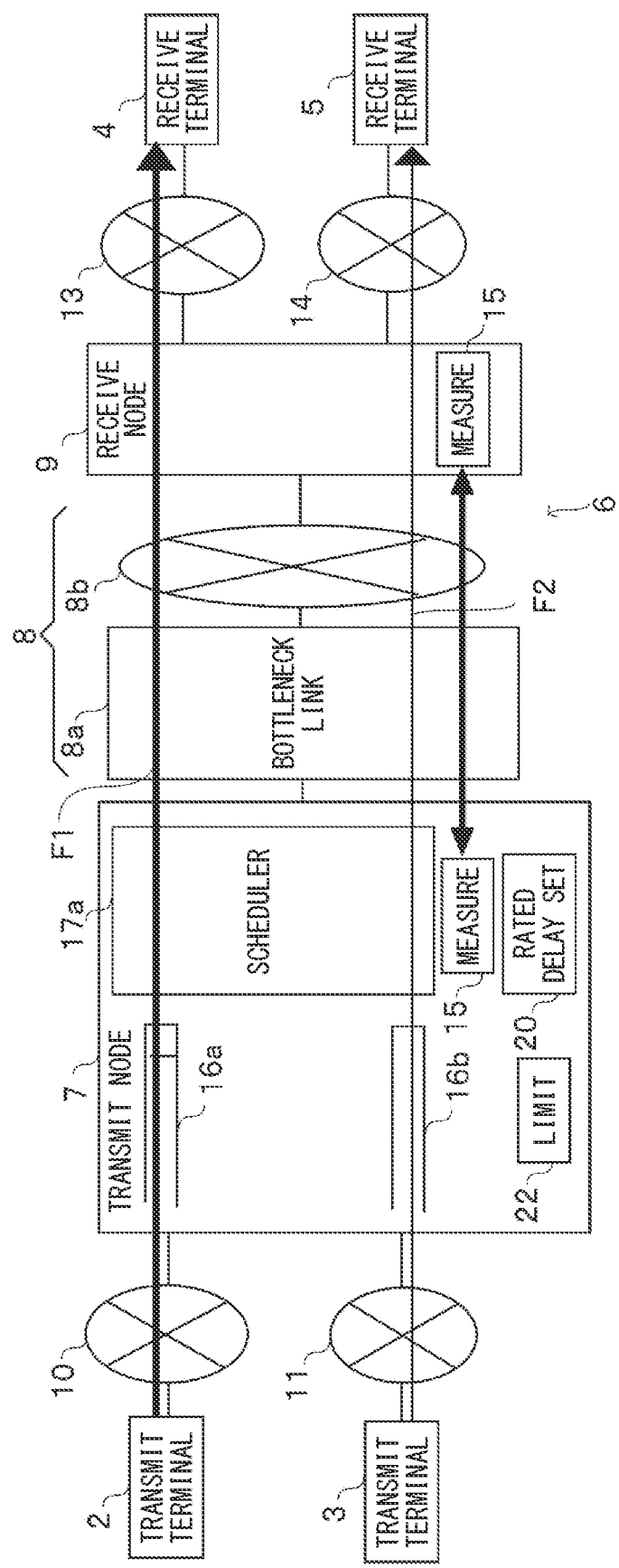
FIG. 1 is a diagram showing a communication flow of an information communication system according to a first embodiment of the present disclosure.

FIG. 1 shows communication flows F1, F2, one or more transmitting terminals 2, 3, and one or more receiving terminals 4, 5 included in an information communication system 1. In the following example, the information communication system 1 that communicates through a network 6 will be conceptually described. Then, an embodiment applied to a communication system of a vehicle 100 will be described.

The information communication system 1 shown in FIG. 1 includes multiple transmitting terminals 2, 3, a transmitting node 7, a link sharing section 8, a receiving node 9, and multiple receiving terminals 4, 5, which are connected by a network 6. In the present disclosure, the transmitting node 7 corresponds to a communication node. The link sharing section 8 is a partial link section shared by communication packet communication flows F1, F2 between the transmitting terminals 2, 3 and the receiving terminals 4, 5. The link sharing section 8 may include a communication link 8a, such as LTE (registered trademark), W-CDMA, WiFi (registered trademark) or the like. As shown in FIG. 1, the link sharing section 8 includes a predetermined communication link 8a and an internet 8b. In the following description, an example in which the communication link 8a corresponds to a bottleneck link that has the most remarkable communication delay in all of the communication flows F1, F2.

The transmitting node 7 includes a rated delay setting unit 20. The rated delay setting unit 20 sets a rated delay ta of the link sharing section 8, which connects the transmitting node 7 and the receiving node 9. For example, the rated delay ta may indicate a rated value of round trip time (RTT). In the present embodiment, the rated delay ta indicates a delay upper limit reference of a communication flow (corresponding to the communication flow F2 in the following specific example to be described), which has the highest priority of data transmission among the multiple communication flows F1, F2 when the transmitting node 7 transmits data through the link sharing section 8.

The multiple transmitting terminals 2, 3 are connected to the transmitting node 7 through respective local networks 10, 11. The transmitting node 7 receives packets transmitted from the multiple transmitting terminals 2, 3. The transmitting node 7 sequentially stores packets transmitted from the multiple transmitting terminals 2, 3 in respective queues 16a, 16b. The transmitting node 7 includes a scheduler 17a. The transmitting node sequentially transmits, through the scheduler 17a, each packet to the receiving node 9 through the link sharing section 8 according to a priority attached to each packet. In response to a reception of the packet, the receiving node 9 relays, through a local network 13, 14, the packet to the receiving terminal 4, 5 according to a destination address stored in the packet. Thus, the receiving terminal 4, 5 can receive the packet.

In the present embodiment, each of the transmitting node 7 and the receiving node 9 includes a measuring unit 15. The measuring units 15 in the transmitting node 7 and the receiving node 9 measure a transmission delay by transmitting and receiving a measurement purpose packet through the link sharing section 8.

The transmitting node 7 includes a limiting unit 22. The limiting unit 22 limits, according to a priority of each communication flow F1, F2 and a comparison result between the rated delay ta and communication delay of the link sharing section 8, a transfer rate of a packet other than the measurement purpose packet in the link sharing section 8.

(Specific Example)

The following will describe a specific example of the present embodiment in which the information communication system 1 described above is applied to a vehicle system 101. The following will describe the specific example with reference to FIG. 2 to FIG. 8. In the vehicle system 101, a navigation ECU 102 mounted on a vehicle 100 or a portable terminal 103 carried into the vehicle 100 by an occupant of the vehicle transmits data to an external device located outside of the vehicle 100. The navigation ECU provides well-known navigation function. In FIG. 2 to FIG. 6, the reference numeral of each component is set corresponding to the reference numeral shown in FIG. 1. Specifically, in FIG. 2 to FIG. 8, for the reference numeral of each component, the numeral in the tens position and the numeral in the units position are the same as those of corresponding reference numeral shown in the information communication system 1 shown in FIG. 1, and "1" is newly added as the numeral in the hundreds position for each reference numeral. Further, the configuration same as that of the information communication system 1 shown in FIG. 1 will be omitted for simple description.

Figure 2:
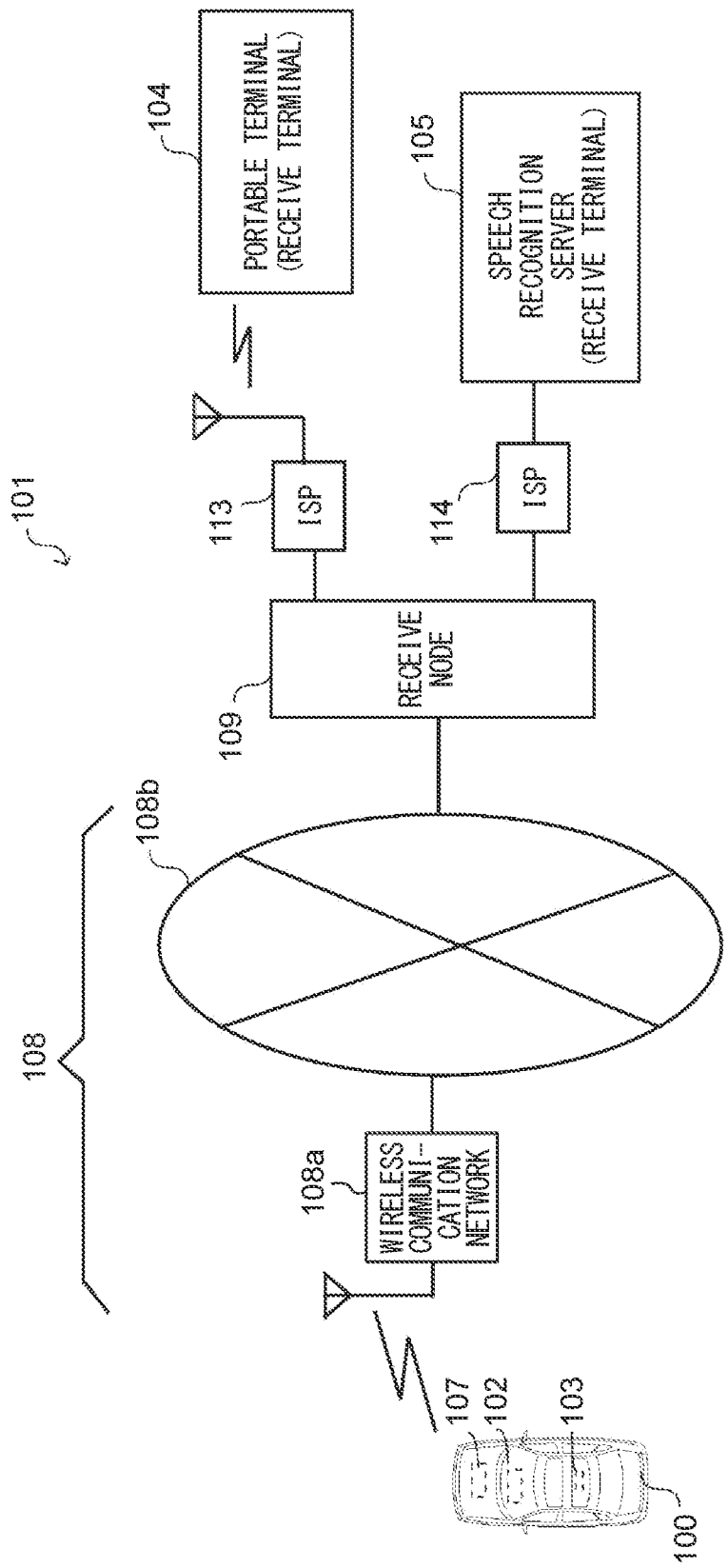
FIG. 2 is a diagram showing an exemplary configuration of an information communication system.
Figure 3:
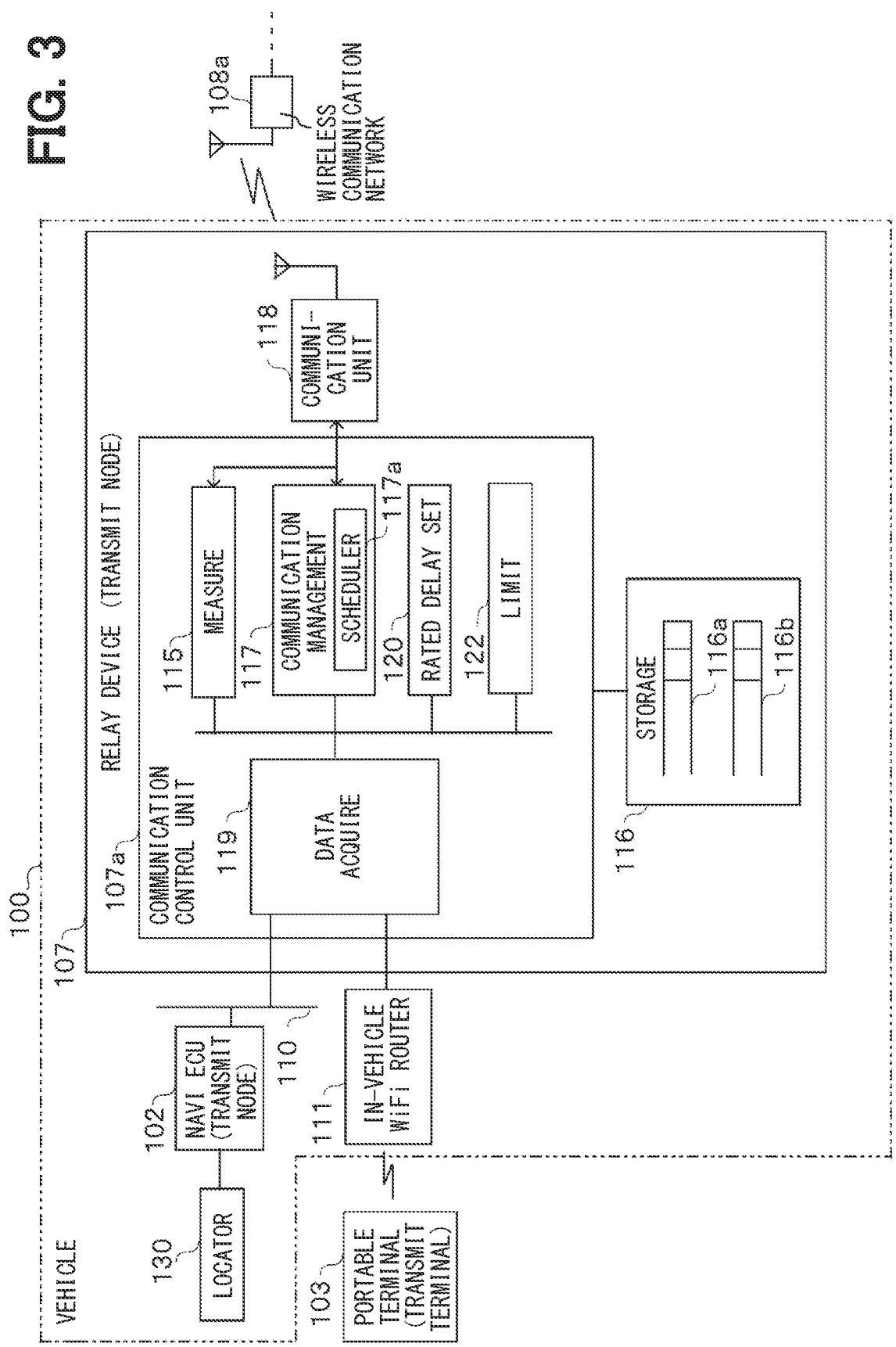
FIG. 3 is a block diagram showing an electrical configuration of a relay device.

FIG. 2 shows an exemplary configuration in which data is transmitted from the navigation ECU 102 and the portable terminal 103 to another portable terminal 104 or a speech recognition server 105 located outside of the vehicle 100. FIG. 3 shows a relay device 107 and a peripheral electrical configuration of the relay device 107.

The present example is applied to a service in a case where a speech recognition request is transmitted from the navigation ECU 102 mounted on the vehicle 100 or the portable terminal 103 to the speech recognition server 105. As shown in FIG. 2 and FIG. 3, the navigation ECU 102 is installed in the vehicle 100. The navigation ECU 102 is connected to a locator 130. The locator 130 includes a global navigation satellite system (GNSS) receiver and an inertial sensor. The GNSS receiver and the inertial sensor are not shown in the drawing for simplification. The navigation ECU 102 acquires current position information of the vehicle from the locator 130. The navigation ECU 102 is able to perform data communication with another ECU (not shown) through an in-vehicle LAN 110. The navigation ECU 102 may be connected to the relay device 107 through the in-vehicle LAN 110.

The portable terminal 103 is a terminal brought into the vehicle 100 by an occupant of the vehicle. The portable terminal 103 may connect to an in-vehicle WiFi router 111 by wireless communication, and communicate with the relay device 107 through the in-vehicle WiFi router 111. The relay device 107 may be provided by a control device, such as a TCU or DCM that mainly includes a microcomputer equipped with a processor, a storage 116, and an I/O. The relay device 107 includes, as a main component, a communication control unit 107a, and further includes a communication unit 118 and the storage 116. Herein, DCM is an abbreviation for data communication module, and TCU is an abbreviation for telematics control unit. In the present embodiment, the relay device 107 corresponds to an information communication device. The storage 116 is provided by a non-transitory tangible storage medium, such as a ROM, RAM, flash memory, or the like.

The communication control unit 107a includes a measuring unit 115, a communication management unit 117 that manages communication using a scheduler 117a, a data acquiring unit 119, a rated delay setting unit 120, and a limiting unit 122. The communication control unit 107a is communicably connected with the storage 116, which includes multiple queues 116a, 116b, and the communication unit 118. A microcontroller included in the communication control unit executes a program stored in the storage 116 to provide the functions of the measuring unit 115, the communication management unit 117, and the rated delay setting unit 120.

The queue 116a stores data transmitted from the navigation ECU 102, and the queue 116b stores data transmitted from the portable terminal 103. The scheduler 117a of the communication management unit 117 sets a communication order of the transmission packets stored in the queues 116a and 116b based on priorities of the packets. The communication management unit 117 sets a communication resource and a communication path of an available communication line that can be used by the communication unit 118. The communication unit 118 is configured in hardware manner, and communicates with an external communication device located outside of the vehicle 100. The communication management unit 117 manages a relationship between an estimated arrival time and a transfer rate for each type communication line.

The measuring unit 115 measures a communication delay of the link sharing section 108 by continuously transmitting and receiving the measurement purpose packets between the relay device 107 and the receiving node 109. The communication management unit 117 transmits the measurement purpose packet with a higher priority than an actual packet transferred from the relay device 107 to the receiving node 109, and measures the communication delay.

The rated delay setting unit 120 sets the rated delay ta in the link sharing section 108. The rated delay setting unit 120 sets, as the rated delay ta, a delay upper limit reference of the communication flow F2 having the highest transmission priority among the communication flows F1, F2. As described above, the relay device 107 and the receiving node 109 communicates data through the communication link sharing section 108 in the communication flows F1, F2. The link sharing section 108 referred to herein includes a wireless communication network 108a managed by a wireless communication carrier and an internet 108b.

The limiting unit 122 limits, according to (i) a priority of each communication flow F1, F2 implemented by the link sharing section 108 and (ii) a comparison result between the rated delay ta and a communication delay of the link sharing section 108 measured by the measuring unit 115, a transfer rate of a packet in the link sharing section 108 other than the measurement purpose packet.

The rated delay setting unit 120 sets the rated delay ta for the link sharing section 108. The limiting unit 122 limits the transfer rate of packets to be transferred from the queues 116a and 116b so as to satisfy the rated delay ta set by the rated delay setting unit 120.

Figure 4:
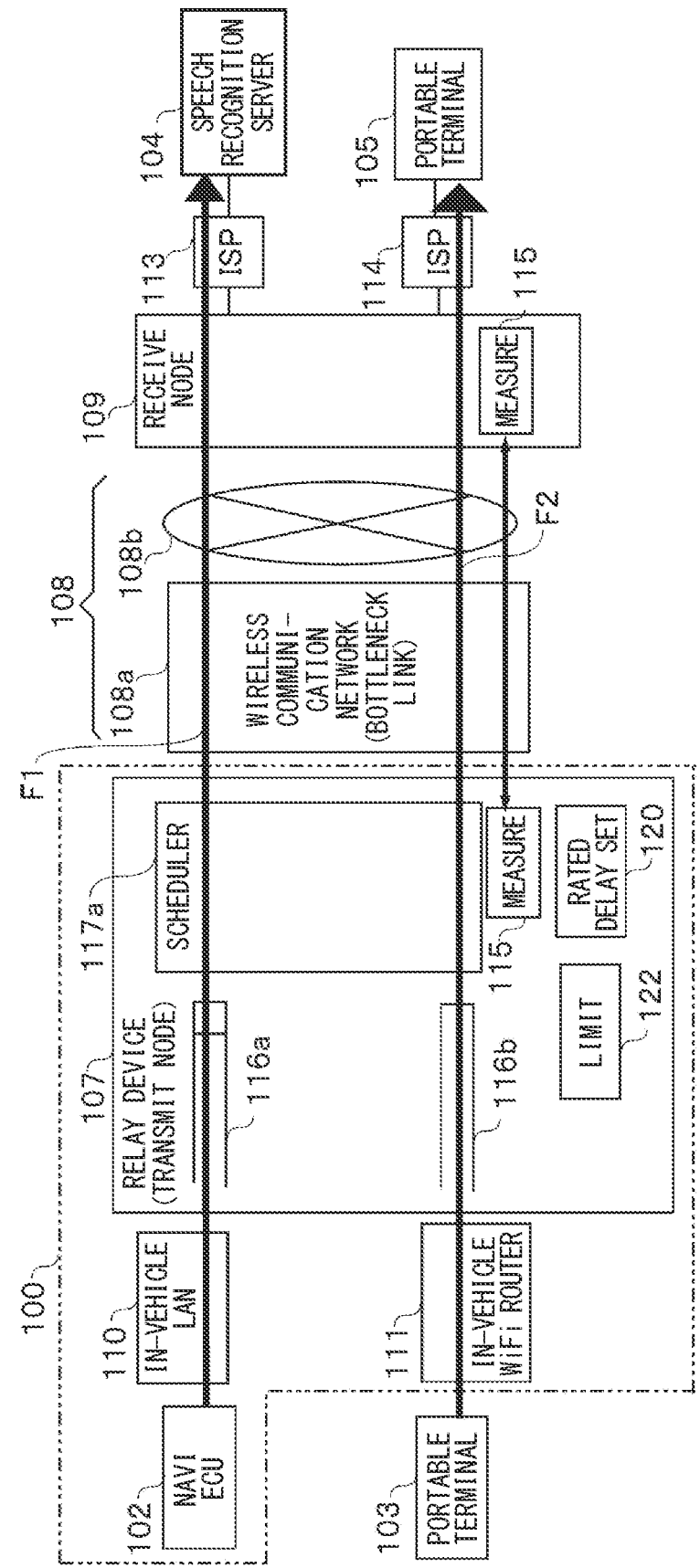
FIG. 4 is a diagram showing a communication flow of data transmission from a navigation ECU and a portable terminal carried into a vehicle to an external device.
Figure 5:
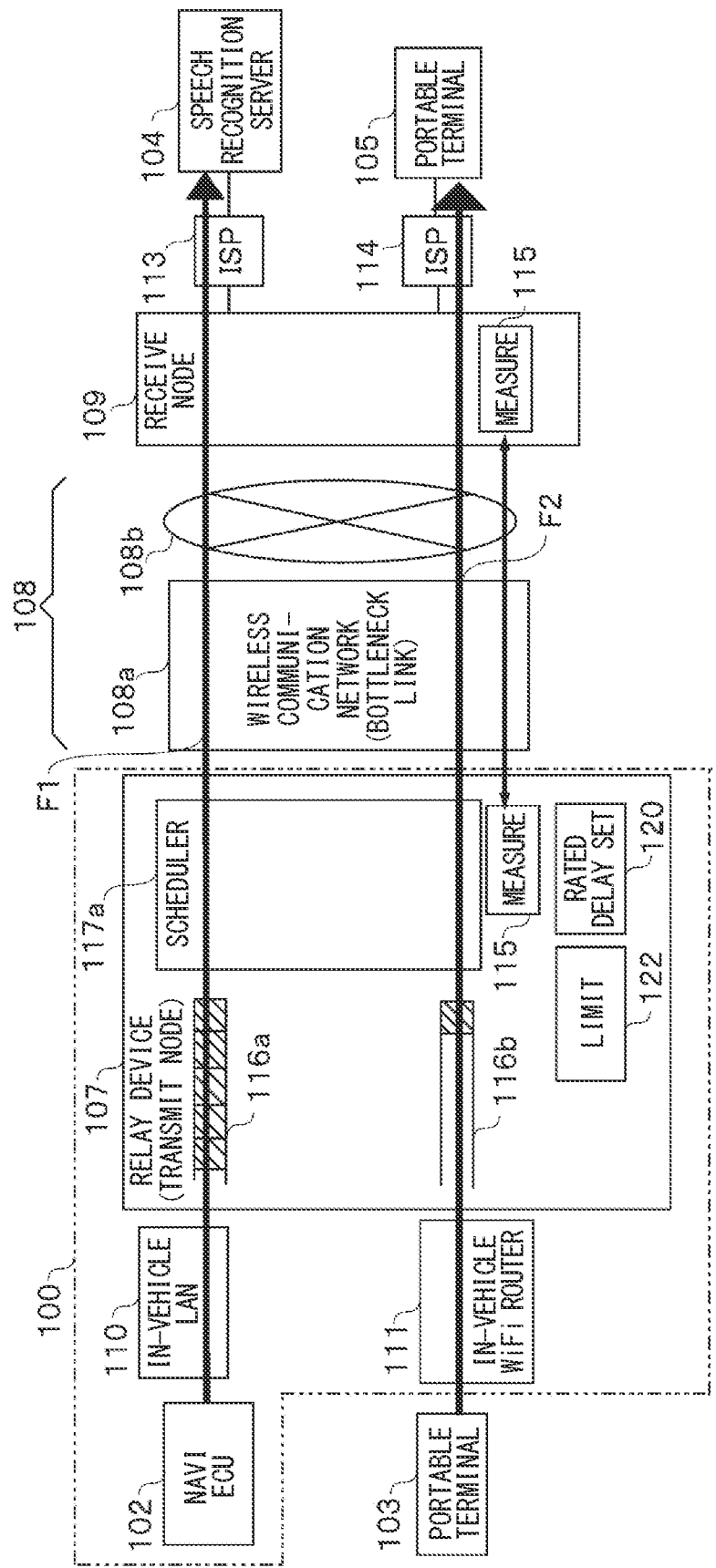
FIG. 5 is another diagram showing a communication flow of data transmission from a navigation ECU and a portable terminal carried into a vehicle to an external device.

As illustrated in FIG. 4 and FIG. 5, the wireless communication network 108a corresponds to a bottleneck link having the slowest data transfer rate in the path of the end-to-end communication flow F1, F2. The wireless communication network 108a may be provided by a core network, such as LTE (registered trademark), W-CDMA, WiFi (registered trademark). The relay device 107 transfers data to the receiving node 109 through the wireless communication network 108a and the internet 108b.

The receiving node 109 transmits the packet transferred from the relay device 107 to ISPs 113 and 114. ISP is an abbreviation for internet service provider. The ISPs 113, 114 transmit packets to various terminals, such as the portable terminal 104 and the speech recognition server 105.

Figure 6:
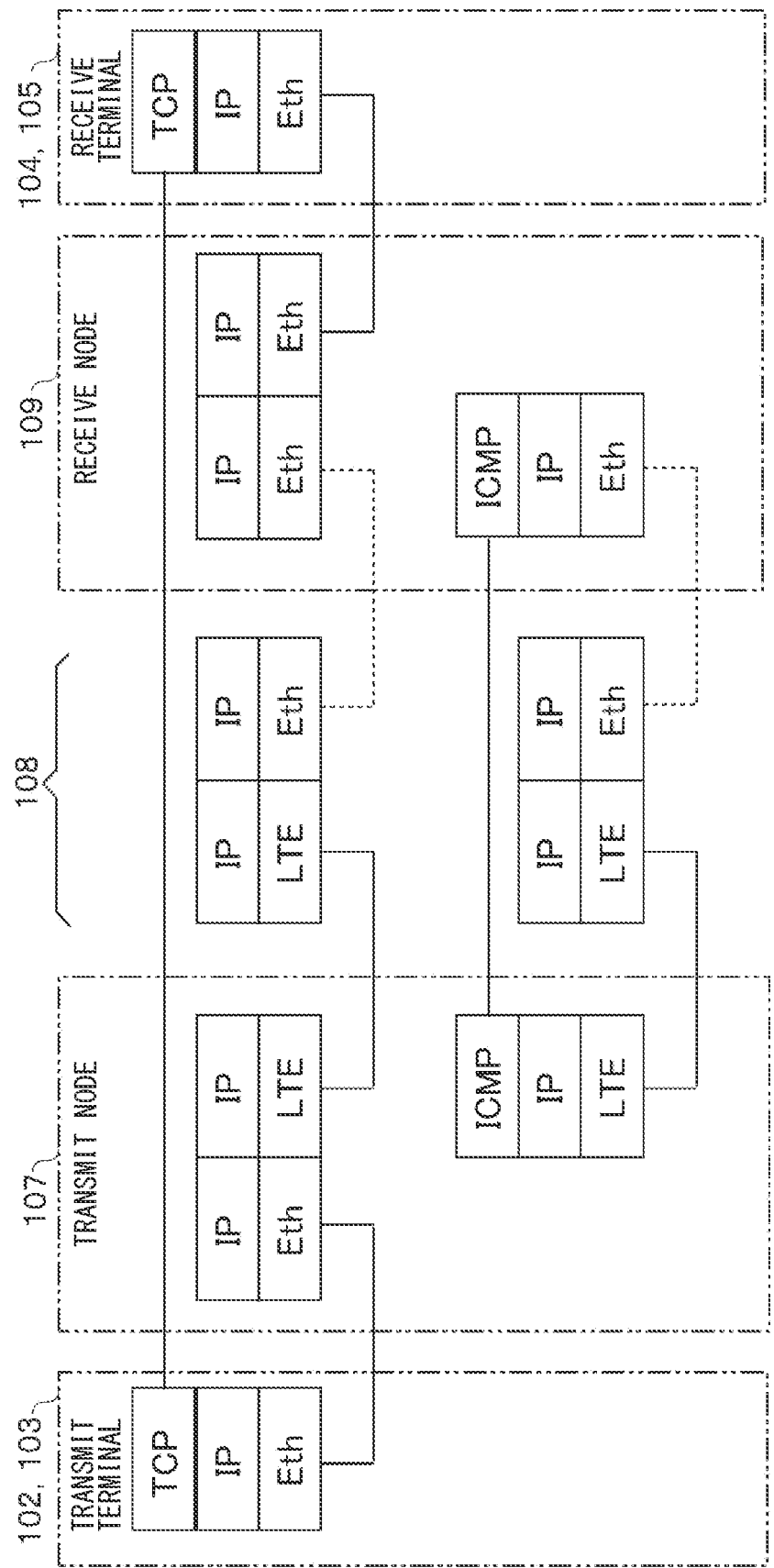
FIG. 6 is a diagram showing a protocol stack applied to each device included in information communication system.

FIG. 6 shows a protocol stack of the system. Normally, the TCP/IP protocol is used in communication of network 6 through the internet 108b. As shown in FIG. 6, in a lower layer of the protocol stack, LTE is used in the communication between the relay device 107 and the wireless communication network 108a. For other communications in the lower layer of the protocol stack, an Ethernet (Eth) other than LTE is used.

When the measuring unit 115 measures the transfer rate, for example, a ping command that transmits and receives an echo request message according to ICMP (internet control message protocol) may be generated by the measurement purpose packet. Then, the ping command is transmitted from an IP address assigned to the transmitting node 7 to an IP address assigned to the receiving node. Alternatively, the ping command may be transmitted from the IP address assigned to the receiving node 9 to the IP address assigned to the transmitting node. Then, a response speed of the ping command may be detected to measure the data transfer rate of the measurement purpose packet. The data transfer rate may be measured only in one-way link, such as only in an uplink or only in a downlink. Alternatively, the data transfer may be measured for the round trip, such as both in the uplink and the downlink.

The following will describe an operation of the system. In FIG. 4 and FIG. 5, the communication flow F1 indicates a case where a speech recognition request is transmitted from the navigation ECU 102 to the speech recognition server 105, and the communication flow F2 indicates a case where the portable terminal 103 performs a telephone call and speech communication with the portable terminal 104 by a telephone call application.

The voice data of the telephone call application transmitted through the communication flow F2 requires real time communication. On the contrary, the communication flow F1 of data transfer other than the telephone call, for example, the communication flow F1 of the speech recognition request to the speech recognition server 105 by the navigation application executed by the navigation ECU 102 requires a lower level of real time response than the communication flow F1.

The amount of speech data requested and transmitted in the communication flow F1 is smaller than the amount of speech recognition data requested and transmitted in the communication flow F2. In such a case, the relay device 107 transfers, via the scheduler 117a, the packets under a condition that the communication flow F2 has a smaller load and a higher priority as compared with the communication flow F1.

As described above, the measuring unit 115 constantly measures the communication delay of the link sharing section 108 between the relay device 107 and the receiving node 109 by transmitting and receiving the measurement purpose packet. When the relay device 107 transfers initial data of the measurement purpose packet, the limitation of data transfer rate by the limiting unit 122 is in a deactivated state. As shown in time point t0 to time point t1 of FIG. 7, the initial data is transferred without limitation of input bandwidth under the non-load delay tm. The non-load delay tm indicates an original communication delay of the communication line of the wireless communication network 108a, and corresponds to a round-trip propagation time RTprop disclosed in "BBR: Congestion-Based Congestion Control".

As shown in FIG. 5, when the communication delay measured by the measuring unit 115 is smaller than a threshold value determined with reference to the rated delay ta, the communication management unit 117 does not perform a bandwidth control in the relay device 107. At this time, the relay device 107 sequentially transfers the packets stored in the queues 116a and 116b regardless of the type of application executed by the navigation ECU 102 or the portable terminal 103.

When the amount of transferred data, which is also referred to as Inflight, increases with an elapse of time, the increase in the bottleneck link bandwidth of the wireless communication network 108a stops at time point t1. Herein, the amount of transferred data, that is, Inflight indicates amount of data that has been input to the wireless communication network 108a and reception completion is not yet confirmed in the receiving node 109. This is because the bottleneck link may have reached the maximum bandwidth available with the resource allocated in the wireless communication network 108a. However, as shown from time point t1 to time point t2, the relay device 107 increases the data load in the wireless communication network 108a by increasing the amount of transfer data until the rated delay ta is reached, regardless of whether the bandwidth continues to increase.

The wireless communication network 108a typically implements an access mechanism for resources in consideration of fairness. When the wireless communication network 108a is, for example, a 4G/5G cellular line, the communication resource is allocated according to the amount of data waiting to be transferred based on the buffer status report (BSR). In this cellular line, the bandwidth of bottleneck link depends on the buffer amount of the bottleneck IF, and resource allocation is performed according to the buffer amount.

Suppose that WiFi (registered trademark) is used as the wireless communication network 108a. WiFi adopts distributed coordination function (DCR), and sets a higher transfer priority for the packet that arrived earlier according to CSMA/CA (Carrier Sense Multiple Access with Collision Avoidance) method. Therefore, the relay device 107 can increase a probability of acquiring data transfer opportunity by keeping the buffer of the WiFi interface populated with the data at all times.

Figure 8:
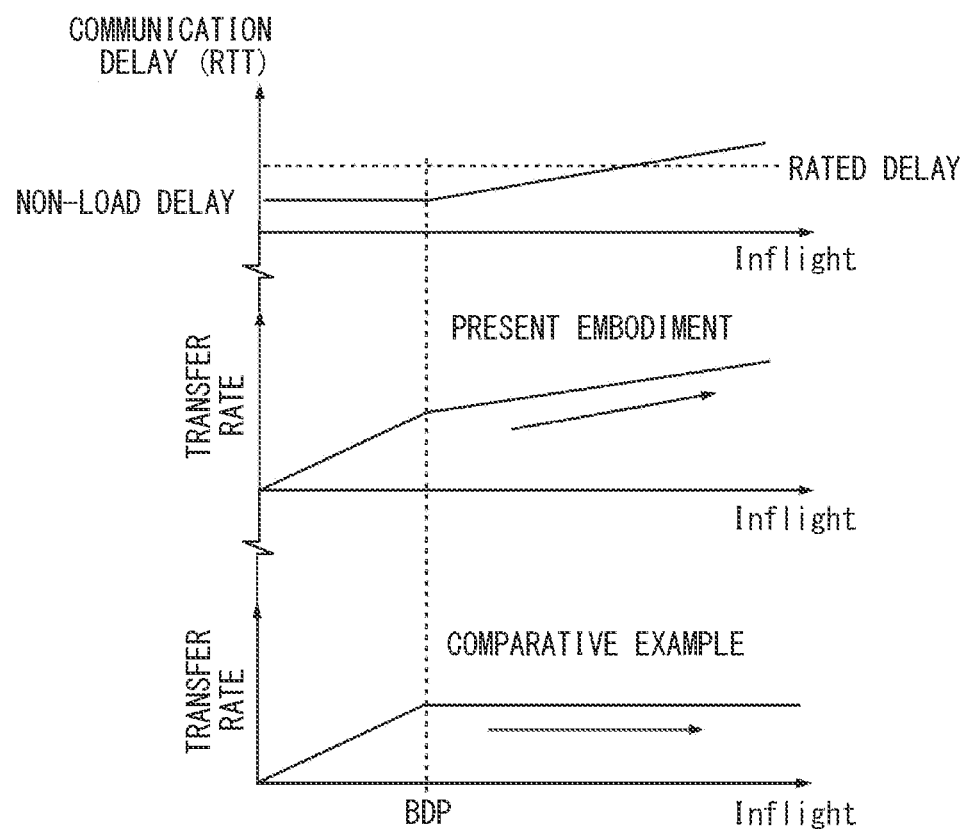
FIG. 8 is a diagram showing delay characteristics and data transfer rates of the present disclosure and a comparative example corresponding to Inflight change.

In such a link where the amount of acquired resource changes according to the buffer state, even when communication delay increases to a level higher than the non-load delay tm corresponding to the increase of the total transfer data amount Inflight, the transfer rate continuously increases as shown in a middle graph of FIG. 8 without being maintained at a fixed level as shown in a comparative example shown in a lower graph of FIG. 8. In FIG. 8, refer to a region where the total amount of transferred data Inflight is equal to or greater than a predetermined value BDP. The predetermined value BDP shown here is a value estimated based on the technique described in "BBR: Congestion-Based Congestion Control", and is calculated by multiplying a maximum bandwidth (maxBW) by a minimum communication delay (minRTT).

Figure 7:
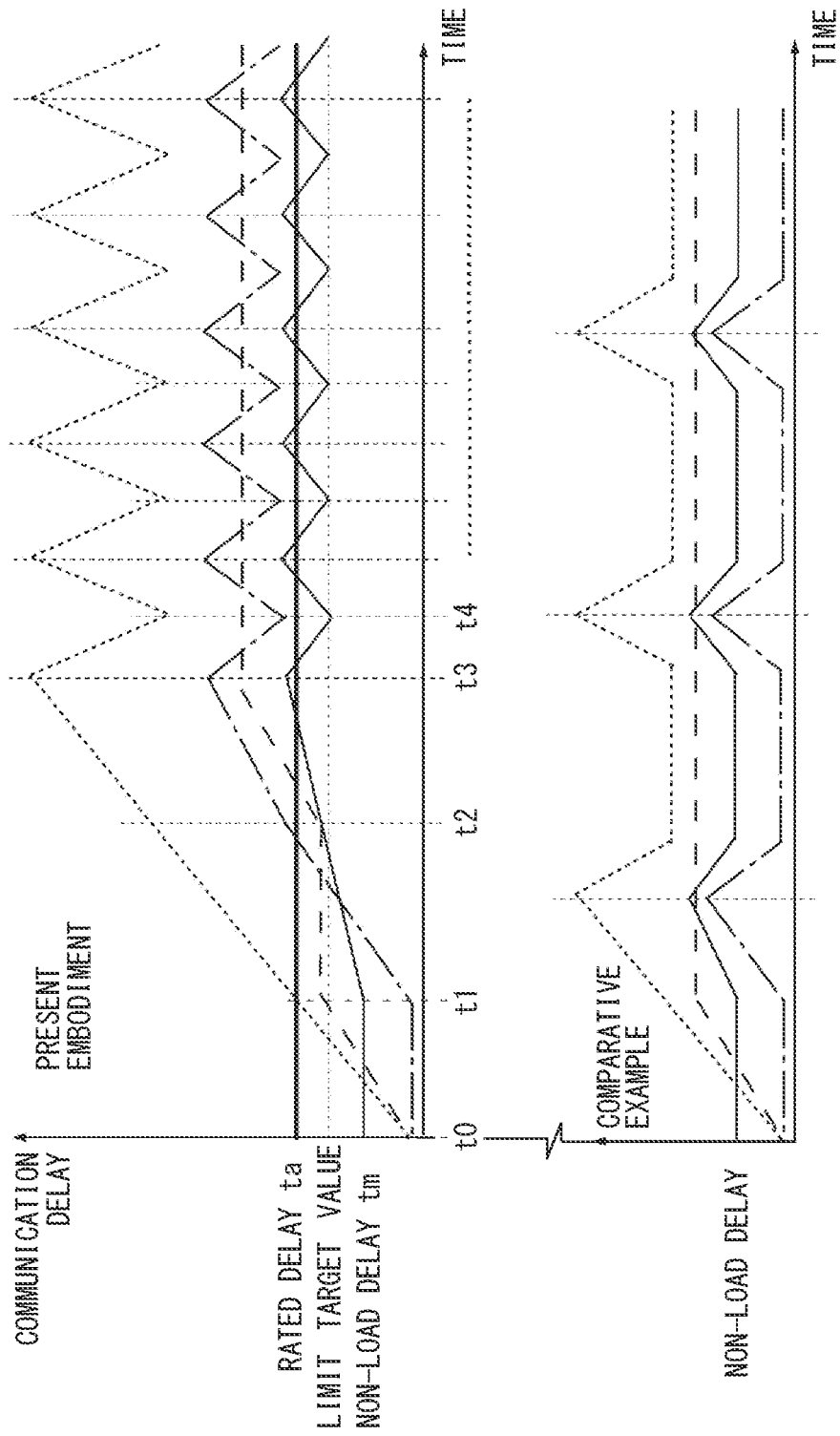
FIG. 7 is a diagram showing delay characteristics of the first embodiment of the present disclosure and a comparative example.

Therefore, regardless of the input limiting bandwidth, the trial of transfer may be continued to increase the total transfer data amount Inflight until the transfer rate reaches the rated delay ta. By increasing the amount of transfer data and continuing to apply the communication load to the wireless communication network 108a, the relay device 107 can acquire more resource allocation as shown in FIG. 7, specifically from time point t2 to time point t3. The example shown in FIG. 7 shows a case where the bottleneck link is a communication line of wireless communication network 108a in which additional resource is allocated in response to the amount of data in the buffer increasing to be equal to or greater than a certain amount. The time point when the amount of data in the buffer reaches the certain amount corresponds to time point t2. The relationship between the actual buffer state and the allocation resource generally differs depending on the network standard, and even though the network has the same standard, it differs depending on the implementation and settings of the base station equipment and the like.

When the communication delay measured by the measuring unit 115 decreases, at a time point t3, to a level lower than the rated delay ta, which is the delay upper limit reference set in advance to be higher than the RTprop, the relay device 107 adjusts, using the limiting unit 122, the input bandwidth limit for adjusting the communication delay.

As shown in FIG. 5, when the communication delay measured by the measuring unit 115 becomes longer than the rated delay ta, the communication management unit 117 limits the bandwidths of the communication flows F1, F2, limits total amount of packets input to the link sharing section 108 to be equal to or less than a predetermined level, and limits the transfer rate of packets to be equal to or lower than a target limit value. At this time, the priorities of the communication flows F1, F2 may be considered, and bandwidth of packets to be transferred through the communication flow having lower priority may be limited first. At the time of such input bandwidth limitation, the scheduler 117a of the communication management unit 117 sequentially stores the packets input from the navigation ECU 102 and the portable terminal 103 in the queues 116a and 116b of the relay device 107, respectively.

The target limit value of the transfer rate may be set to zero, that is, a transfer stop. Alternatively, the target limit value of the transfer rate may be set to a proper default value. Alternatively, the target limit value of the transfer rate may be set to a value obtained by multiplying the transfer rate immediately before a confirmation of congestion in the link sharing section 108 by a predetermined ratio, that is, may be set to a value obtained by multiplying the transfer rate in a state where the communication delay is confirmed to be lower than the rated delay ta for the last time by the predetermined ratio.

The rule for determining the target limit value of the transfer rate may be stored separately in the storage 116. The limiting unit 122 may determine the target limit value by referring to the rule stored in the storage 116. After the communication delay decreases to be lower than the rated delay ta, the bandwidth limit value, which corresponds to the time point at which the determination that the communication delay being decreased to be lower than the rated delay, may be increased by a predetermined ratio to control the communication delay.

When the target limit value is set to a non-zero value, such as a proper default value, the scheduler 117a preferentially outputs the accumulated packets in the queue 116b of the communication flow F2 to the link sharing section 108 even though the input bandwidth in limited state. Therefore, as shown by hatched packets in queues 116a and 116b of FIG. 5, a delay rate of the packets in the queue 116b is slower than that of the queue 116a. That is, the packets are accumulated in queue 116a faster than the queue 116b.

With this configuration, the probability that the communication delay of the communication flow F2 having a lower load and a higher priority reaches or exceeds the rated delay ta can be reduced without depending on the load condition of another communication flow F1. Further, by performing control based on the rated delay ta, bufferbloat can be prevented. In the above-described example of the present embodiment, the real time requirement of the telephone call application can be satisfied.

Further, the communication management unit 117 discards the packets, which are stored in the queues 116a and 116b and to be transferred, in response to a predetermined condition being satisfied. The predetermined condition for discarding the packet may be satisfied when a stay time of the packet in the queue 116a, 116b reaches or exceeds a predetermined timeout duration. Alternatively, the predetermined condition for discarding the packet may be satisfied when the packet is input after the stored data in the queue 116a, 116b exceeds a predetermined upper limit data amount. This condition may also be stored separately in the storage 116, and the communication management unit 117 may refer to this condition and discard the packet.

Next, the details of the method of setting the rated delay ta will be described with reference to FIG. 9. The rated delay setting unit 120 sets the rated delay ta for the link sharing section 108. Specifically, the rated delay setting unit 120 may set, as the rated delay ta, that is, an upper limit of the rated delay ta, a minimum required delay which is the shortest delay among delays required by the applications executed in the navigation ECU 102 and the portable terminal 103.

As described above, the speech data transfer process of the telephone call application has a higher real-time requirement than the data transfer requested from, for example, a navigation application other than the telephone call application. The applications have different delay requirements when transmitting the packets. Since the required delay differs for each application, the upper limit of the rated delay ta is set to the shortest required delay after acquiring all available delay requirements from respective applications. At this time, the shortest required delay may be selected from the required delays of currently used applications. Alternatively, the shortest required delay may be selected from the required delays of applications that include currently-used applications and applications that are not currently used but may be used in the near future. Then, the upper limit of rated delay ta is set to the shortest required delay.

Figure 9:
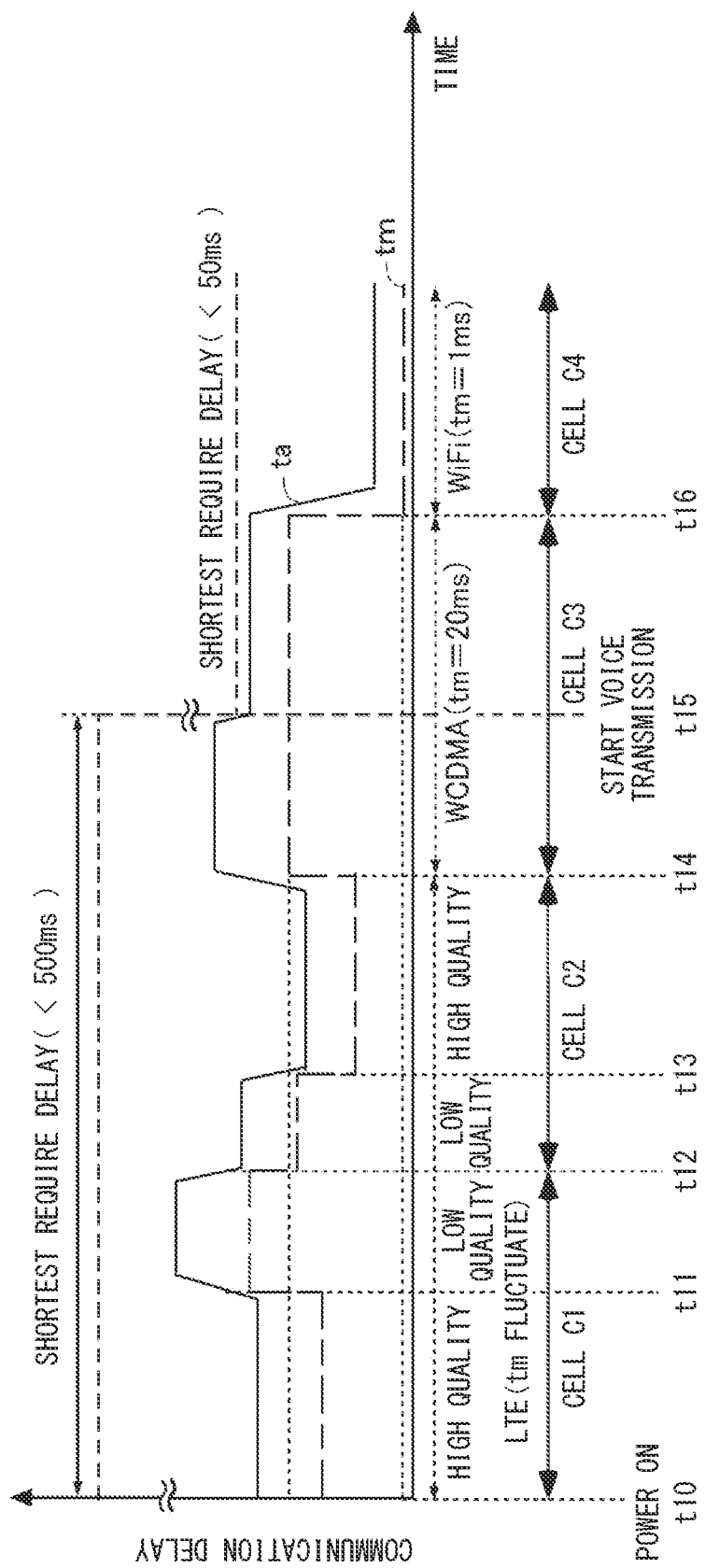
FIG. 9 is a diagram schematically showing a relationship among a minimum required delay required by the application, a non-load delay, and a rated delay.

At the time point t10 shown in FIG. 9, when a power switch of the vehicle 100 is turned on and the power supply is started, the navigation ECU 102 is activated and the navigation ECU executes a navigation application. When the user speaks a destination using the navigation system, that is, the user inputs a voice signal indicating the destination to the navigation system, the navigation ECU 102 accesses the speech recognition server 105 through the relay device 107, and receives a cloud speech recognition service via the speech recognition server 105. When the link sharing section 108 is being used or is scheduled to be used, the required delay is set by the navigation application.

For example, when the required delay for speech recognition purpose communication is set to 500 ms by the navigation application, the relay device 107 sets the required delay of the corresponding communication flow F1 to 500 ms. In a case where this delay is the shortest required delay among the delays required by all of the applications, for example, if no other application is running and the navigation application performs no communication other than the speech recognition purpose communication, the required delay 500 ms is set as the shortest required delay. The required delay of each communication flow may be set by the application as described above. Alternatively, the required delay of each communication flow may be set in advance corresponding to attribute of corresponding flow. The attribute of flow may be defined, for example, by an address and port number of an access destination server, protocol type, and a value assigned to a field of a protocol header which defines a communication quality.

After that, at time point t15 shown in FIG. 9, when the telephone call application installed, in advance, in the portable terminal 103 is activated in response to an operation made by an occupant of the vehicle 100, the telephone call application of the portable terminal 103 starts telephone call with another portable terminal 104 through the relay device 107.

When the required delay is set to 50 ms by the telephone call application, the relay device 107 determines that the required delay of the communication flow F2 used by the telephone call application is shorter than the required delay of the communication flow F1, and updates the shortest required delay to 50 ms. The rated delay setting unit 120 sets the shortest required delay as the upper limit of the rated delay ta. Thus, both of the delays required by the navigation application and the telephone call application can be satisfied. Since the set rated delay can satisfy the telephone call application having the shortest required delay, the occupant of the vehicle 100 can comfortably use the telephone call application without a response delay.

The shortest delay of the wireless communication network 108a may be set as a lower limit of the rated delay ta. As described above, the wireless communication network 108a corresponds to the bottleneck link of the link sharing section 108. The shortest delay of the wireless communication network 108a corresponds to the delay tm in a non-load state (hereinafter referred to as non-load delay tm). The non-load delay tm is a delay in a state where communication can be performed through the wireless communication network 108a without applying any communication load from the relay device 107. The non-load delay tm corresponds to the RTprop, which is the original communication delay of the communication line described in "BBR: Congestion-Based Congestion Control".

For example, the non-load delay tm may be set for each type of wireless communication network 108a such as LTE (registered trademark), W-CDMA, WiFi (registered trademark), and the lower limit of the rated delay ta may be set to be equal to the non-load delay tm.

When determining the non-load delay tm, a table stored in advance in the storage 116 corresponding to attribute of each link may be referred to. For example, the non-load delay may be set to a predetermined fixed value, such as 5 ms for LTE, 20 ms for W-CDMA, and 1 ms for WiFi. Based on the delay sample measured by the measuring unit 115, the non-load delay tm estimated by applying statistical processing, such as selecting the shortest delay among a large number of delay samples may be adopted.

The attribute of link depends on the connected system, such as LTE, W-CDMA, WiFi and a network connection state of the connected system. Corresponding to the attribute of link, an estimated non-load delay tm and the rated delay ta may be properly changed. The attribute of link also varies according to country or area. For example, the same LTE may have different delays in different countries. In Japan, for example, in the case of a remote island included in Tokyo, the delay is longer than that of Tokyo city area due to the delay in the core network of the wireless communication network 108a. Therefore, it is better to set different values for different network connection areas.

The non-load delay tm may be determined based on the standard information and design information of the wireless system itself. For example, under LTE standard, the communication delay in the wireless communication network 108a is defined as a predetermined value, for example, within 5 ms. Therefore, 5 ms is delayed even in the non-load state. Thus, it is preferable to set 5 ms as the non-load delay tm. When another non-load delay tm in the link sharing section 8 is known in advance, a delay obtained by adding all of the known non-load delays, which include the above-described 5 ms, may be defined as the non-load delay tm.

When the relay device 107 is in connected state with the same type of wireless communication network 108a, the rated delay ta may be changed as necessary while changing the estimated non-load delay tm based on the network connection state.

For example, at time points t12, t14, and t16 in FIG. 9, when the connection cell C1 changes to C2, C3, C4 in order, the setting of estimated non-load delay tm may be changed accordingly. When the connection cell C1 to C4 changes, the communication frequency band, bandwidth, base station transmission power, and the like may change accordingly. In such a case, the setting of non-load delay tm may be changed accordingly, and the rated delay setting unit 120 may set the rated delay ta within an appropriate range with the non-load delay tm as the lower limit.

The non-load delay tm changes corresponding to the wireless link state. When the amount of allocated resource or the like changes dynamically, the non-load delay tm changes accordingly. Therefore, the setting of non-load delay tm may be changed according to the change of non-load delay tm, and the rated delay ta may also be set to within an appropriate range so as to match the change of non-load delay tm.

The wireless link has a large fluctuation of delay due to the retransmission caused by packet discard and the fluctuation of the propagation environment. Further, the measurement result of delay has an error range for the same transfer data amount Inflight. Thus, it is difficult to obtain the predetermined value BDP with high reliability by using small amount of samples. Therefore, the rated delay ta is set to a value higher than the known non-load delay tm with a margin. The margin is set to be equal to or greater than the fluctuation amount. By setting the rated delay ta to a value higher than the known non-load delay tm with a predetermined margin, it is possible to prevent a decrease in bandwidth utilization efficiency due to delay fluctuation or an excessive delay.

For example, the measuring unit 115 determines that the link quality is high when a CQI is equal to or higher than a predetermined level. Herein, CQI is a parameter indicating a propagation path quality. When the CQI is lower than the predetermined level, the measuring unit 114 determines that the link quality is low. The setting of non-load delay tm may be changed according to the determined link quality. As shown in FIG. 9, when the relay device 107 is connected to the connection cell C1 of the wireless communication network 108a, the link quality is good, that is, the quality is high even in the same connection cell C1 as shown by a duration from time point t10 to time point t11. Thus, the delay tends to be short. Therefore, the non-load delay tm may be estimate and set to be a small value, that is, short duration.

On the contrary, when the link quality is poor, that is, when the link quality is low, the delay tends to be long. Therefore, as shown by a duration from time point t11 to time point t12 in FIG. 9, the non-load delay tm is estimated and set to be a great value, that is, long duration. As descried above, the setting of non-load delay tm may be properly changed, and accordingly, the rated delay ta may be changed within an appropriate range.

For example, when the communication operator of the connection destination, that is, the carrier is changed by performing roaming or the like during a moving, the non-delay tm changes accordingly. The setting of non-load delay tm may be changed according to the change of non-load delay tm, and the rated delay ta may also be set to within an appropriate range so as to match the change of non-load delay tm. As described above, when the connection cells C1 to C4, the wireless link state, or the communication operator is changed, the setting of non-load delay tm is changed and the rated delay ta is changed accordingly. With this configuration, the scheduler 117a can always maintain the rated delay ta within a proper predetermined range even when load, that is, transfer data is input to the link sharing section 108.

In the present embodiment, the rated delay ta is set for the link sharing section 108 as the delay upper limit reference of the highest priority communication flow F2 transferred by the relay device 107. The limiting unit limits, according to the priority of each communication flow F1, F2 and the comparison result between the rated delay ta and the communication delay of link sharing section 108, the transfer rate of a packet other than the measurement purpose packet in the link sharing section 108. With this configuration, the transfer rate of the packet can be appropriately adjusted in the link sharing section 108. The rated delay ta is set with the shortest delay of the wireless communication network 108a, which is the bottleneck link in the link sharing section 108, as the lower limit. The rated delay ta is set with the shortest required delay required by the application through the relay device 107 as the upper limit. Thus, it is possible to set the rated delay ta to have a more appropriate range.

The following will describe a comparative example related to a conventional art, and the effect of the present embodiment with respect to the effect of comparative example. In the comparative example, for the reference numeral of each component, the numeral in the tens position and the numeral in the units position are the same as those of corresponding reference numeral described in the above embodiment of the present disclosure, and "2" is newly added as the numeral in the hundreds position for each reference numeral.

Comparative Example

Figure 10:
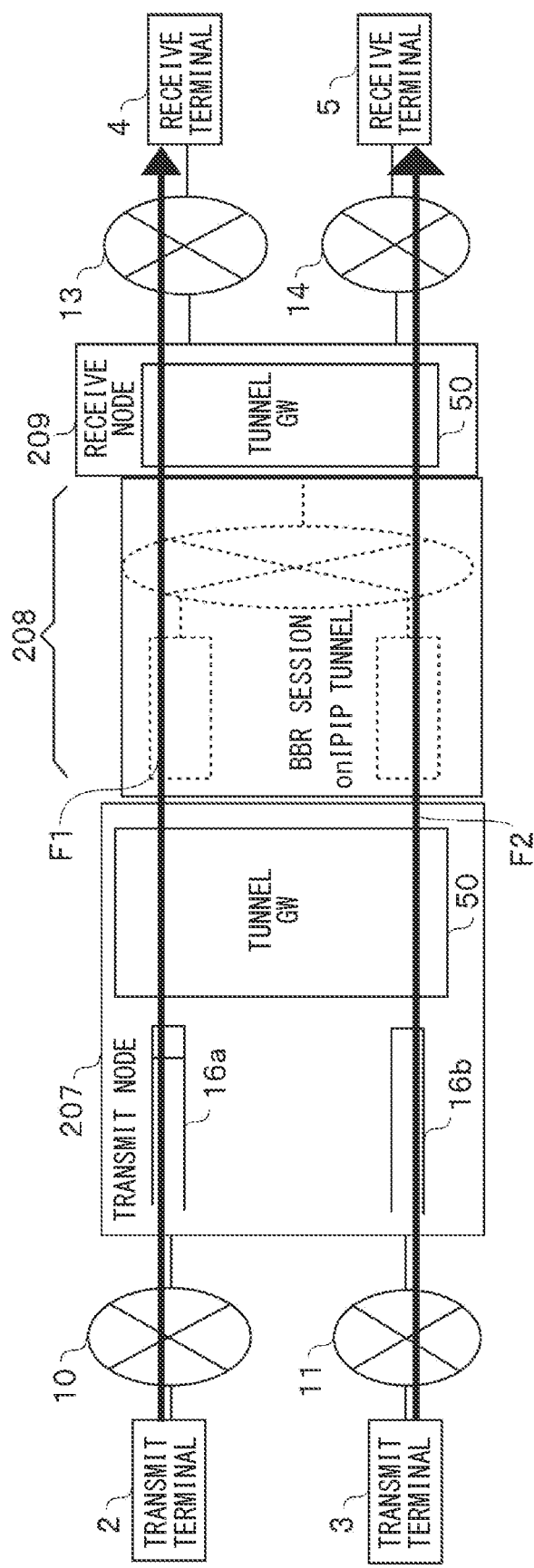
FIG. 10 is a diagram showing a configuration and a communication flow of a comparative example.

A comparative example will be described based on the technique described in "BBR: Congestion-Based Congestion Control" since this conventional art performs processing close to that of the present embodiment. As shown in FIG. 10, suppose that the comparative example has a configuration in which two tunnel gateways 50 for IPIP tunneling are arranged corresponding to the transmitting node 207 and the receiving node 209 located at two ends of the link sharing section 208. In this art, the tunnel gateway 50 are arranged corresponding to the transmitting node 207 and the receiving node 209, and tunneling is performed using an existing tunneling protocol, such as IPIP. As shown in FIG. 10, it is conceivable to introduce BBR session described in "BBR: Congestion-Based Congestion Control" into the IPIP tunnel. The tunnel gateway 50 implements the retrieval of queues 16a and 16b corresponding to the priority, and the flow rate control is performed within the BBR session.

However, the technique described in "BBR: Congestion-Based Congestion Control" is TCP-based technique, and has a large protocol header and large processing overhead. For a communication line in which the communication delay does not increase corresponding to the bandwidth saturation as in the cellular line, the above-described configuration does not operate in optimal way. In "BBR: Congestion-Based Congestion Control", it is reported the cellular line fluctuation can be followed by increasing the gain to 1.25. However, since the gain changes depending on the control status of the cellular line, tuning of the gain to find the optimum value is difficult.

The maximum communication delay based on the execution of the applications by the transmitting terminals 2, 3 is larger than the original communication delay of the line, RTTprop, by a margin. Since this peak exists, the error of the band measurement increases when the load is applied in both directions.

As described above, the bottleneck link bandwidth in the cellular line depends on the buffer amount of the interface of the bottleneck line. In session control using BBR, the bottleneck speed is obtained as the saturated point with respect to the applied load, but only the minimum bottleneck band is secured. The change in a case where the comparative example is applied is shown in the lower graph of FIG. 7. When the communication delay reaches the bottleneck band, the communication delay is reduced, thereby controlling the RTTprop, which is the original communication delay of the line.

Configuration and Effect of Present Embodiment with Respect to Comparative Example When the method described in the present embodiment is adopted, the load can be constantly applied to the wireless communication network 108a by controlling the communication delay within the range of rated delay ta. The range of rated delay is set to have a larger value than the known non-load delay tm. Further, resource allocation can be acquired in the wireless communication network 108a, which corresponds to the bottleneck link. In other words, according to the present embodiment, a wide bandwidth can be obtained by setting the rated delay ta to have a large value. As a result, the end-to-end throughput can be improved for both of the communication flows F1 and F2. The present embodiment is also advantageous in that both processing and communication overhead can be configured to be small.

Second Embodiment

Figure 11:
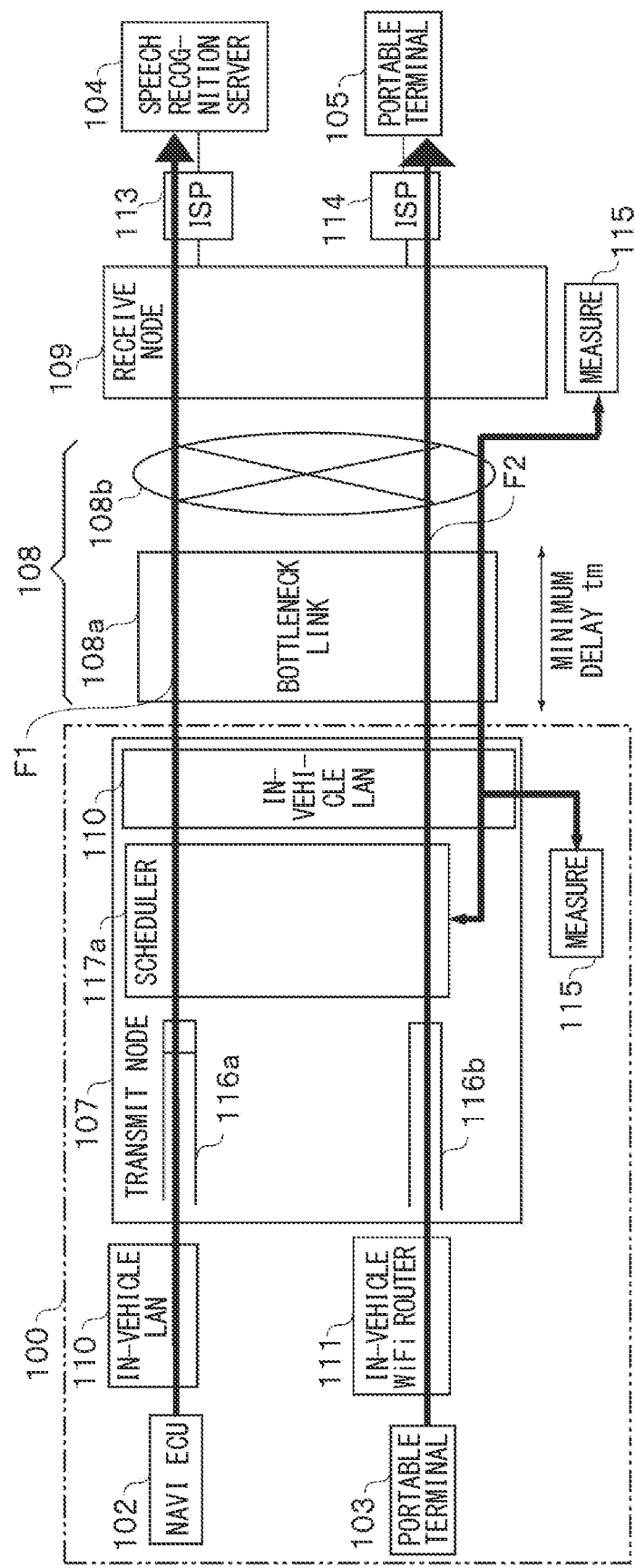
FIG. 11 is a diagram showing a measurement mode in a second embodiment of the present disclosure.

A second embodiment will be described with reference to FIG. 11. As shown in FIG. 11, the measuring unit 115 is configured independent from the relay device 107.

In this configuration, the measuring unit 115 can directly measure the transfer rate of the in-vehicle LAN 110 and the link sharing section 108 independent from the relay device 107. In this configuration, the measuring unit 115 can measure the transfer rate to not include the transfer delay of the relay device 107 as much as possible. The measuring unit 115 transmits, to the scheduler 117a of the communication management unit 117 through the in-vehicle LAN 110, the measurement result measured based on the measurement purpose packet. Then, the scheduler 117a manages the packet transfer process based on the measurement result. Therefore, the present embodiment provides similar technical effect as the foregoing embodiments.

Third Embodiment

Figure 12:
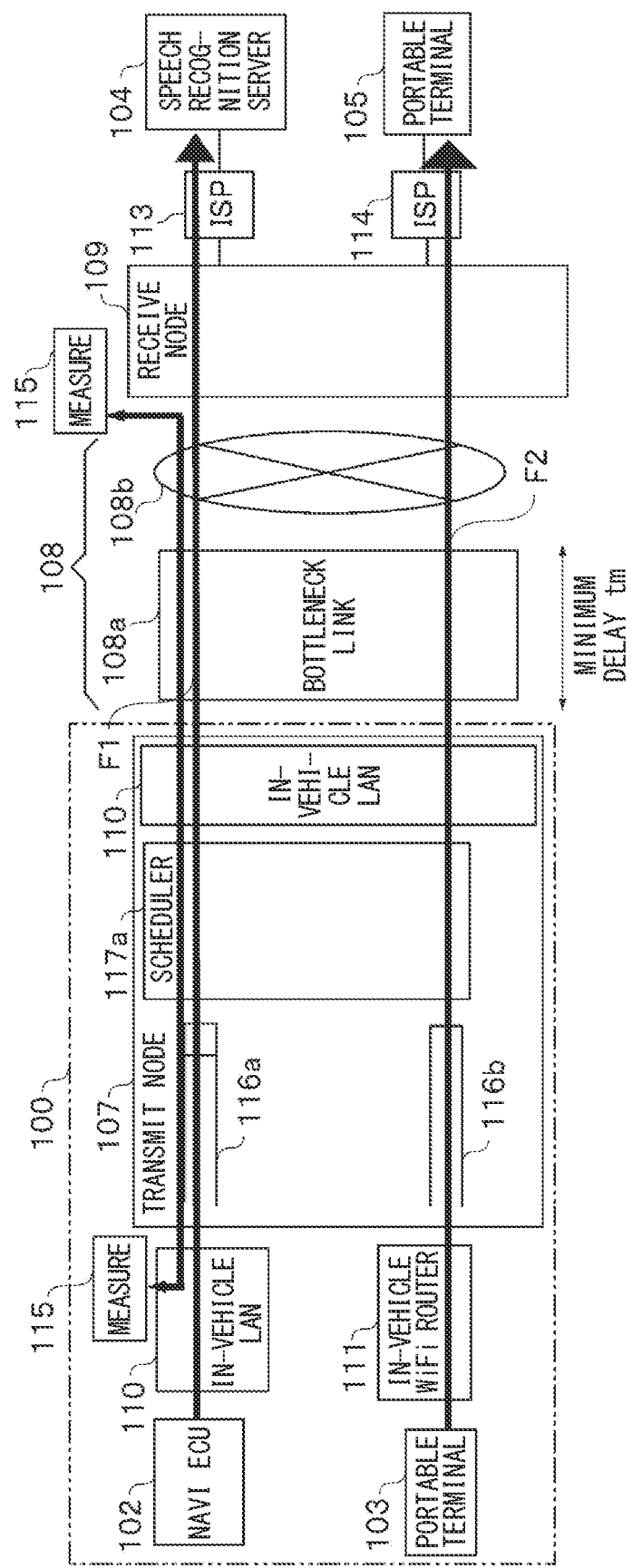
FIG. 12 is a diagram showing a measurement mode in a third embodiment of the present disclosure.

A third embodiment will be described with reference to FIG. 12. As shown in FIG. 12, the measuring unit 115 may be configured as a part of vehicle device mounted on the vehicle 100, which is connected with the relay device 107. The measuring unit 115 transmits the measurement purpose packet to the relay device 107.

The scheduler 117a of the relay device 107 transfers the measurement purpose packet from the measuring unit 115 to an external device located outside of the vehicle 100 with the highest priority. Also in this case, the measuring unit 115 can measure the transfer rate of a path including the in-vehicle LAN 110, the relay device 107, the wireless communication network 108a, and the internet 108b. Therefore, the present embodiment provides similar technical effect as the foregoing embodiments.

Other Embodiments

The present disclosure should not be limited to the embodiments described above, and various modifications may further be implemented without departing from the spirit of the present disclosure. For example, the following modifications and extensions may be made.

The storage 116 may include a non-volatile storage medium. The storage medium may store various programs to executed by a corresponding processor. For example, the storage 116 is not limited to a configuration mounted on a circuit board, and may be configured by a memory card or the like, and is electrically connected to the processing circuit of the relay device 107 by being inserted into a slot for the memory card.

The transmitting node 7 and the relay device 107, and methods thereof described in the present disclosure in the above embodiments may be implemented by one or more than one special-purpose computer. Such a computer may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits.

Alternatively, the transmitting node 7 and the relay device 107, and methods thereof described in the present disclosure in the above embodiments may be achieved using one or more dedicated computers constituted by a combination of the processor and the memory programmed to execute one or more functions and the processor with one or more hardware logic circuits. The computer program may be stored, as instructions to be executed by a computer, in a computer-readable non-transitory tangible storage medium.

Although the present disclosure has been described in accordance with the above embodiment, it is understood that the present invention is not limited to the described embodiment or configuration. The present disclosure includes various modifications and variations within the scope of equivalents. In addition, various combinations and forms, as well as other combinations and forms including only one element, more than that, or less than that, are also within the scope and idea of the present invention.

What is claimed is:

1. A communication device comprising:
one or more processors, which control a first communication flow performed by a first terminal and
a second communication flow performed by a second terminal, wherein both of the first communication flow and
the second communication flow pass through a sharing section and
the second communication flow has a higher priority than a priority of the first communication flow,
wherein the one or more processors are configured to:
acquire a communication delay in the sharing section;
acquire a rated delay of the second communication flow, the rated delay is a communication delay allowed to the second communication flow; and
limit input of data from the first communication flow and the second communication flow to the sharing section based on
(i) a comparison result between the communication delay of the sharing section and the rated delay and
(ii) the priorities of the first communication flow and the second communication flow.

2. The communication device according to claim 1, wherein
the sharing section includes a bottleneck link, and
the rated delay is set with a shortest delay of the bottleneck link as a lower limit.

3. The communication device according to claim 1, wherein
the rated delay is set with a shortest required delay required by an application related to the second communication flow as an upper limit.

4. The communication device according to claim 1, wherein
the one or more processors control a communication rate in the sharing section by limiting the input of data from the first communication flow and the second communication flow to the sharing section based on the comparison result between the communication delay of the sharing section and the rated delay, and
the one or more processors set a target value of the communication rate in the sharing section to at least one of (i) zero, (ii) a default value other than zero, or (iii) a value related to the communication rate of the sharing section before a congestion state of the sharing section is confirmed.

5. The communication device according to claim 1, wherein
the rated delay is set to be higher than a known non-load delay in advance, and
the one or more processors control the communication delay by controlling the rated delay within a predetermined range while a communication load is applied to the sharing section.

6. The communication device according to claim 1, wherein
the one or more processors limit the input of data from the first communication flow and the second communication flow to the sharing section when the communication delay of the sharing section exceeds the rated delay.

7. The communication device according to claim 1, wherein
the one or more processors, limit, based on the comparison result between the communication delay of the sharing section and the rated delay, the input of data from the first communication flow or the second communication flow to the sharing section by keeping a queue of communication interface populated with data in the first communication flow or the second communication flow.

8. The communication device according to claim 1, wherein
the communication device is mounted on a vehicle,
the first terminal has a vehicle navigation function,
the second terminal is a portable terminal,
the first communication flow is a communication flow related to a speech recognition, and
the second communication flow is a communication flow related to a telephone call.

9. The communication device according to claim 8, wherein
the communication device is a relay device that relays communications through the first communication flow and the second communication flow between an in-vehicle network mounted on the vehicle and the sharing section.

10. The communication device according to claim 1, wherein
the sharing section includes a wireless communication network.

11. The communication device according to claim 10, wherein,
the wireless communication network is a cellular line.

12. The communication device according to claim 9, wherein,
the second terminal connects to the in-vehicle network via a wireless local network.

13. The communication device according to claim 1, wherein
the sharing section includes a network that acquires, corresponding to a buffer amount of data to be transferred to the sharing section, resource to be used for transferring the data.

14. The communication device according to claim 1, wherein
the one or more processors acquire the communication delay in the sharing section by communicating a measurement purpose packet through the sharing section.

15. The communication device according to claim 14, wherein
the one or more processors does not limit input of the measurement purpose packet to the sharing section regardless of the comparison result between the communication delay of the sharing section and the rated delay.

16. A vehicle equipped with the communication device according to claim 1.

17. A communication method comprising:
acquiring a communication delay in a sharing section used in common by a first communication flow performed by a first terminal and
a second communication flow performed by a second terminal,
the second communication flow having a higher priority than a priority of the first communication flow;
acquiring a rated delay of the second communication flow, the rated delay being a communication delay allowed to the second communication flow; and
limiting input of data from the first communication flow and the second communication flow to the sharing section based on
(i) a comparison result between the communication delay of the sharing section and the rated delay and
(ii) the priorities of the first communication flow and the second communication flow.

18. A non-transitory computer-readable tangible storage medium storing instructions to be executed by a computer, the instructions comprising the communication method according to claim 17.

* * * * *